(12) United States Patent
Yarygin et al.

(10) Patent No.: US 9,769,417 B1
(45) Date of Patent: Sep. 19, 2017

(54) METADATA TRANSFER IN AUDIO VIDEO SYSTEMS

(71) Applicant: Lattice Semiconductor Corporation, Portland, OR (US)

(72) Inventors: Sergey Yarygin, San Jose, CA (US); Laurence A Thompson, San Jose, CA (US); Chandlee B Harrell, San Jose, CA (US); Gyudong Kim, San Jose, CA (US)

(73) Assignee: Lattice Semiconductor Corporation, Portland, OR (US)

( * ) Notice: Subject to any disclaimer, the term of this patent is extended or adjusted under 35 U.S.C. 154(b) by 0 days.

(21) Appl. No.: 14/928,921

(22) Filed: Oct. 30, 2015

Related U.S. Application Data

(60) Provisional application No. 62/075,554, filed on Nov. 5, 2014.

(51) Int. Cl.
| | |
|---|---|
| *H04N 7/00* | (2011.01) |
| *H04N 11/00* | (2006.01) |
| *H04N 7/088* | (2006.01) |
| *G11B 27/036* | (2006.01) |
| *H04N 7/01* | (2006.01) |
| *H04N 7/035* | (2006.01) |

(52) U.S. Cl.
CPC ......... *H04N 7/0884* (2013.01); *G11B 27/036* (2013.01); *H04N 7/007* (2013.01); *H04N 7/0125* (2013.01); *H04N 7/035* (2013.01); *H04N 7/0881* (2013.01)

(58) Field of Classification Search
USPC ....... 348/467, 469, 476, 477, 478, 479, 490, 348/460, 463, 456, 459, 441, 443, 439.1, 348/434.1, 435.1, 513, 526, 545, 633, 348/634, 682, 701, 317, 43, 14.15; 375/240.24, 240.28, 240.01, 240.02; 382/190

See application file for complete search history.

(56) References Cited

U.S. PATENT DOCUMENTS

| | | | | |
|---|---|---|---|---|
| 6,226,038 B1* | 5/2001 | Frink | .................. | G11B 27/034 |
| | | | | 348/443 |
| 6,278,739 B2* | 8/2001 | Enomoto | ......... | H04N 21/23602 |
| | | | | 348/722 |
| 6,525,723 B1* | 2/2003 | Deering | .................... | G06T 5/20 |
| | | | | 345/419 |
| 6,642,966 B1* | 11/2003 | Limaye | ............ | H04N 21/23892 |
| | | | | 348/460 |

(Continued)

*Primary Examiner* — Jefferey F Harold
*Assistant Examiner* — Mustafizur Rahman

(57) ABSTRACT

Aspects relate to transmission of metadata from a source to a sink device, and optionally through one or more intermediaries. A source device encodes metadata into what would have been a blanking area of a field to be transmitted, according to a current video format. The source device encodes a timing for an active video data signal that is modified from a timing that would be used only for transmission of video data at a current resolution. A separate indicator from the source, or a negotiation between source and sink allows the sink to determine what part of the data indicated as being active video data is metadata, and to use that metadata for controlling aspects of the video display, and to use other parts of the received video data as video data for display. A sink can signal supported capabilities to a source.

11 Claims, 8 Drawing Sheets

(56) References Cited

U.S. PATENT DOCUMENTS

| | | | | |
|---|---|---|---|---|
| 6,658,060 B2* | 12/2003 | Otaka | ............ | H04N 5/919 375/240.26 |
| 6,834,083 B1* | 12/2004 | Tahara | ............ | G11B 27/032 375/240 |
| 7,012,964 B1* | 3/2006 | Nakano | ............ | H04N 19/89 375/240.28 |
| 7,356,051 B2 | 4/2008 | Pasqualino et al. | | |
| 7,360,067 B2* | 4/2008 | Arimilli | ............ | G06F 15/173 709/216 |
| 8,942,259 B2* | 1/2015 | Pasqualino | ............ | H03L 7/085 348/375 |
| 2002/0097869 A1* | 7/2002 | Pasqualino | ............ | H03L 7/085 380/200 |
| 2002/0164030 A1* | 11/2002 | Stephenson | ............ | H04B 7/18504 380/270 |
| 2005/0047447 A1* | 3/2005 | Satoh | ............ | G09G 5/006 370/535 |
| 2007/0188662 A1* | 8/2007 | Winger | ............ | H04N 19/00 348/701 |
| 2007/0296858 A1* | 12/2007 | Eymard | ............ | H04N 7/0115 348/456 |
| 2009/0232222 A1* | 9/2009 | Stockhammer | ... | H04L 29/06027 375/240.24 |
| 2009/0274218 A1* | 11/2009 | Lavelle | ............ | G06F 3/14 375/240.25 |
| 2009/0278984 A1* | 11/2009 | Suzuki | ............ | G09G 5/003 348/554 |
| 2010/0115409 A1* | 5/2010 | Robert | ............ | G06F 17/30979 715/716 |
| 2011/0096079 A1* | 4/2011 | Carter | ............ | G06F 1/3265 345/520 |
| 2012/0081514 A1* | 4/2012 | Hasegawa | ............ | H04N 13/0033 348/43 |
| 2012/0207208 A1* | 8/2012 | Wyatt | ............ | G06F 3/14 375/240.01 |
| 2013/0094566 A1* | 4/2013 | Milstein | ............ | H04N 19/63 375/240.02 |
| 2013/0198768 A1* | 8/2013 | Kitazato | ............ | G06F 13/00 725/19 |
| 2014/0020038 A1* | 1/2014 | Dewa | ............ | H04N 21/25816 725/110 |
| 2014/0053710 A1* | 2/2014 | Serletic, II | ............ | G10H 7/00 84/609 |
| 2014/0086335 A1* | 3/2014 | Sasai | ............ | H04N 19/46 375/240.25 |
| 2014/0140536 A1* | 5/2014 | Serletic, II | ............ | G06F 3/0481 381/98 |
| 2014/0320740 A1* | 10/2014 | Wan | ............ | H04N 19/46 348/441 |
| 2015/0009408 A1* | 1/2015 | Ikushima | ............ | H04N 7/08 348/723 |
| 2015/0117515 A1* | 4/2015 | Fu | ............ | H04N 19/103 375/240.02 |
| 2015/0304526 A1* | 10/2015 | Maurice | ............ | H04N 21/4307 348/513 |
| 2015/0347870 A1* | 12/2015 | Andreopoulos | ..... | G06K 9/6267 382/190 |

* cited by examiner

METADATA TRANSFER IN AUDIO VIDEO SYSTEMS

CROSS REFERENCE TO RELATED APPLICATIONS

This application claims priority from U.S. Provisional App. No. 62/075,554, filed on Nov. 5, 2015, which is incorporated by reference in its entirety for all purposes.

BACKGROUND

Field

The following relates, in one aspect, to systems and methods for transferring metadata from one device to another over standard AudioVideo (AV) interfaces.

Related Art

Transmission of AV data from a source device to a sink device is typically implemented according to a pre-defined standard. Providing a standard for communication of such data allows source and sink devices to be built to the standard by different entities and have an expectation that those devices will be able to be used together.

For example, High Definition Multimedia Interface (HDMI) provides a standard that is widely adopted and used in devices for AV data communication. HDMI implements EIA/CEA standard video formats and waveforms. Digital video signals can be broken into three main parts: the vertical blanking region, the horizontal blanking region, and the active picture region. The vertical blanking region contains the vertical sync pulse that signifies a new field or frame (field and frame are used interchangeably herein, unless explicitly indicated otherwise). There are multiple lines of video data in each field.

For example, a Full High-Definition (HD) 1080p/60 Hz video stream has a vertical blanking interval every 16.67 ms (60 Hz) to signify a new frame and a horizontal blanking interval every 14.8 μs to signify a new horizontal line. Within the 14.8 μs horizontal line duration there are 2,200 pixels, which include the horizontal blanking period and the active picture. This requires a pixel clock of 148.5 MHz (1/14.8 μs horizontal line duration*2,200 pixels) to generate the video frame composed of the three regions.

The active picture region is the location of the pixels that a user would see on the display. The pixel color value is stored in three channels that are typically RGB- or YUV (YPbPr)-encoded. The color levels can be encoded in a defined number of bits per channel, such as from between 6 to 16 bits per channel, meaning that each pixel has a 24- to 48-bit color value. A digital monitor communicates Enhanced Display Identification Data (EDID) to a source, in order to describe what video formats and timings that monitor supports.

Information about a current video format is communicated from a source to a sink. In HDMI, a video format is indicated as a standard VIC code in an InfoFrame. An InfoFrame is a packet of data that is provided in a vertical blanking interval (IE: in a period where the video signaling indicates that there is no active video data). Resolution also can be communicated via other mechanisms, such as a DCDB record (as in SuperMHL).

For example, FIG. 1 shows a timing diagram that illustrates how audio and video data are transmitted and timed relative to each other for a frame in HDMI. FIG. 1 depicts an active video area 110, an area containing audio sample packets 115, and unused blanking areas 120a and 120b. FIG. 1 also depicts that part of the blanking area, e.g., blanking area 120a can be filled with inoframe and data island packets. HDMI interleaves video, audio and auxiliary data using three different packet types, called the Video Data Period, the Data Island Period and the Control Period. During the Video Data Period, the pixels of an active video line are transmitted. Data Island packets can be transmitted in a pre-defined location 122 within a blanking interval used for Infoframe and data island packet transmission.

SUMMARY

In one aspect, implementations of the disclosure provide a robust, end-to-end mechanism for signaling metadata from one device to another. Metadata is data about the main payload or other information that is used in formatting, processing, or interacting with the main payload. For example, metadata may include sampling formats.

In one implementation, the active video area is extended into the regions that are not indicated as being active video data, such as the blanking area. In HDMI or MHL, a video data preamble is used to distinguish video data from other data (a portion of a frame transmission period during which data is encoded as video is called a "video period"). A video data preamble contains character sequence(s) that are not permitted in a video data period. This disclosure encodes non-video data into the video data period, but at a physical layer level, this non-video data is encoded and transmitted indistinguishably from video data.

In one implementation, character sequences indicative of a start of a video period may be provided earlier and/or provided later than what would be required purely based on the timing required for the video itself. These extra lines appear to HDMI/MHL receivers and transmitters as video data, and thus there is no need to have HW changes in receivers (sinks), transmitters (sources), including at bridge and switch nodes.

A difference between the standard (expected/determined according to the video mode) and the modified timing can be signaled using an existing source to sink communication method. In such an approach, to determine the timing of actual video data, a sink has to know VIC code and the information on where and how many metadata lines are added In an aspect, hardware forward error correction (FEC) can be added for metadata only. In such implementation, a CPU can perform the FEC processing in a software-implemented stack. FEC could be provided for all Active Lines, and then FEC would likely be implemented with hardware acceleration. Other approaches to signaling a change to an active video period can be provided for different audio/video data transmission systems and approaches.

DETAILED DESCRIPTION

Figure 1:
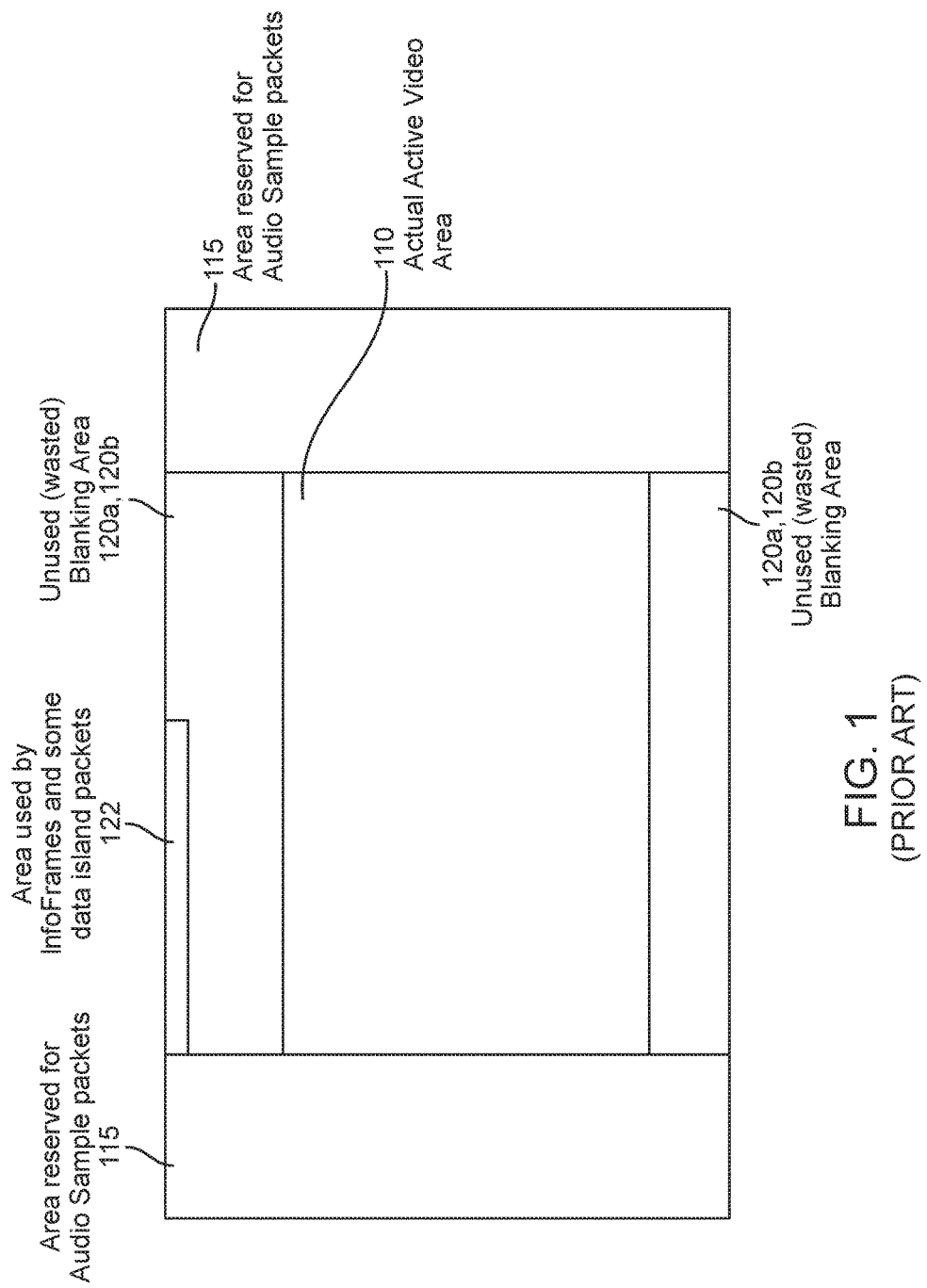
FIG. 1 depicts a prior art approach of encoding metadata into non-video areas (data islands) of a frame transmission.

As shown in FIG. 1, HDMI and MHL provide a capability to transmit Infoframes within a blanking area 120a, 120b. InfoFrame have a relatively small size limit of 27 (31) bytes. This leads to situations where metadata may need to be sent as fragments in multiple infoframes, and then the fragments need to be reassembled. Fragmentation means that less information can be sent, and also that multiple fields may be needed to signal all of the metadata required to indicate a change in some property of the video data. Fragmentation also leads to complications in a sink node, which must extract metadata from multiple infoframes and reassemble the metadata. Infoframes also have a fixed size, which means that sources must pad a data length, in situations which metadata to be communicated is less than the size of the infoframe.

Figure 2:
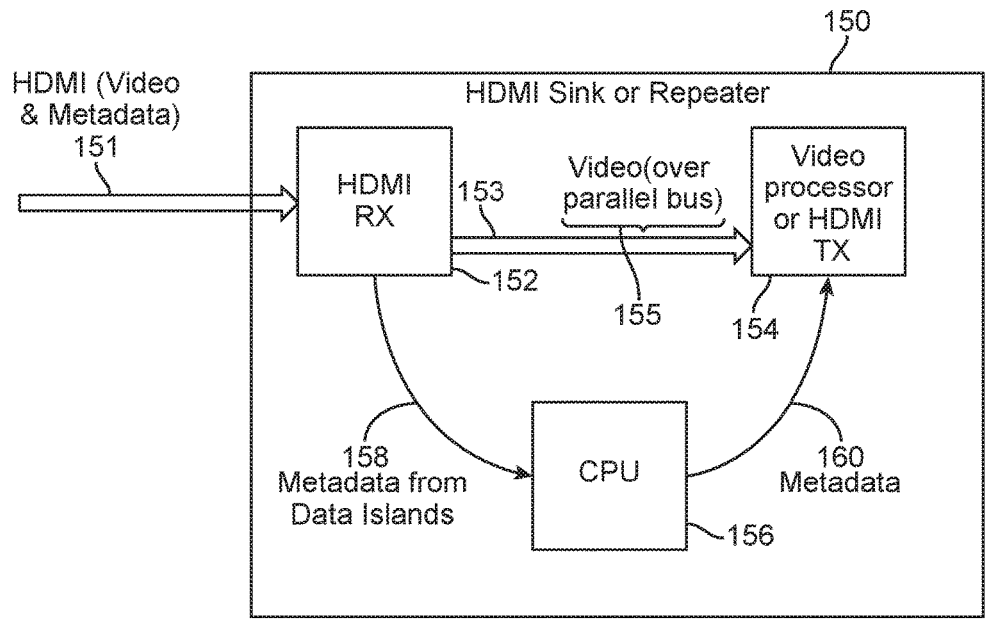
FIG. 2 depicts a prior art approach to an HDMI sink that receives video and metadata transmitted according to FIG. 1 and separately sends the metadata from data islands to a CPU for processing while video data travels over a different path to a video processor.

With reference to FIG. 2, in modern devices, InfoFrames also are de-facto asynchronous, in that there is no standard transport mechanism for sending Data Islands over a parallel video bus (i.e., on the same channel as video and audio data) and instead video and InfoFrames (e.g., with metadata) follow different paths within a processing system. FIG. 2 depicts that HDMI encoded video and metadata arrives at a HDMI sink or repeater 150.

HDMI sink or repeater 150 contain a receiver 152 that is capable of operating the physical layer of HDMI, and extracting the video and metadata. Extracted video 153 is transferred over a parallel bus 155 to a video processor (if a sink) and to an HDMI transmitter (if a repeater) 154. Metadata 160 is received by a CPU 156 and then transferred to the video processor/HDMI transmitter 154. As shown, transfer of metadata can involve transfer through CPUs and interfaces, such as Inter Integrated Circuit Bus (I2C) make it difficult to pass metadata synchronously with video. In some cases, one or more repeaters may exist between a source and a sink. Each repeater between the source and the sink can increase the problem of de-synchronization. In FIG. 2, the metadata 158 is extracted from data islands that are located in pre-defined areas of the video blanking area as shown with respect to FIG. 1.

Figure 3:
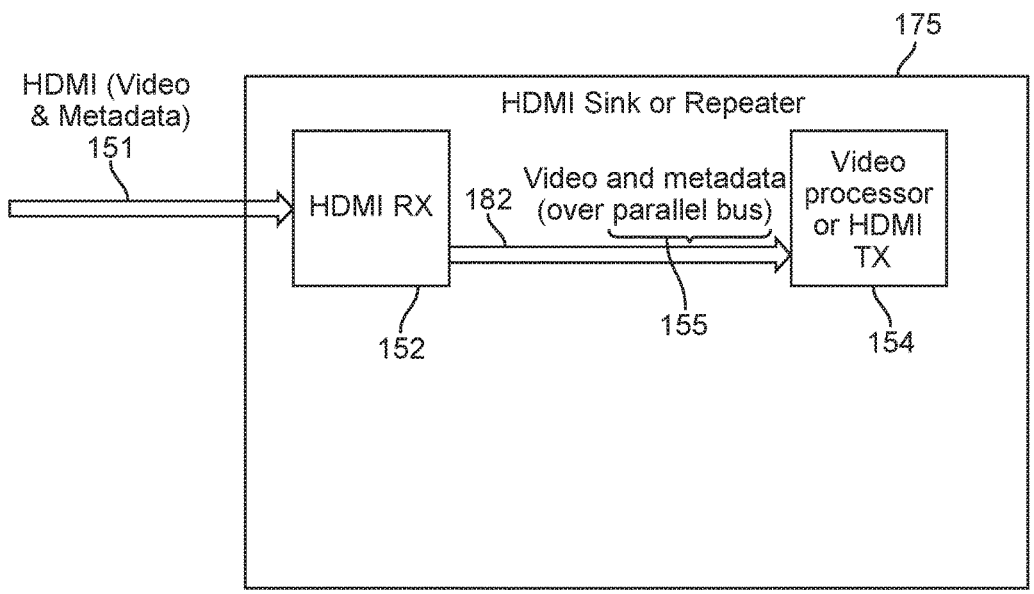
FIG. 3 depicts that in implementations of the disclosure, video and metadata can be received and transmitted to a video processor over the same bus.

FIG. 3 depicts a first example of how an HDMI sink or repeater 175 would handle metadata according to the disclosure. As in FIG. 2, HDMI formatted video and metadata 151 arrives at an HDMI sink or repeater 175. However, HDMI receiver 152 in FIG. 3 does not separately extract metadata from data islands, as in FIG. 2. Rather, HDMI receiver 152 simply receives signals that are encoded as video and places the data contained in those signals on the parallel bus 155. In FIG. 3 however, the video signals also encode metadata that would have been encoded in data islands according to prior approaches to metadata transfer. Video processor or HDMI transmitter 154 can receive the video and metadata (signaled as video) 182 from bus and either process (if a sink) or transmit (if a repeater). Thus, FIG. 3 presents an improvement over approaches according to FIG. 2, in that metadata does not need to be separated from video and transmitted via a separate channel, and then returned to video processor/HDMI transmitter. Rather, video data has the same path as metadata within a device and the metadata information can be transferred over video bus 155 as if it is actual video.

One advantage of implementations according to FIG. 3 is that the involvement of CPU 156 in metadata transfer may be eliminated, which may allow for a lower power and/or cheaper CPU to be used in HDMI sink or repeater 175, for example. Approaches according to FIG. 3 can lead to further advantages. One advantage is that significantly more metadata may be encoded with one field or frame than what can be encoded in an InfoFrame or a data island packet. Also, synchronization between video and metadata is naturally maintained throughout the entire video path, because metadata is treated as video data. The approach is compatible with current HDMI and MHL hardware architecture, although some hardware may require a software or firmware update as described below.

Figure 4:
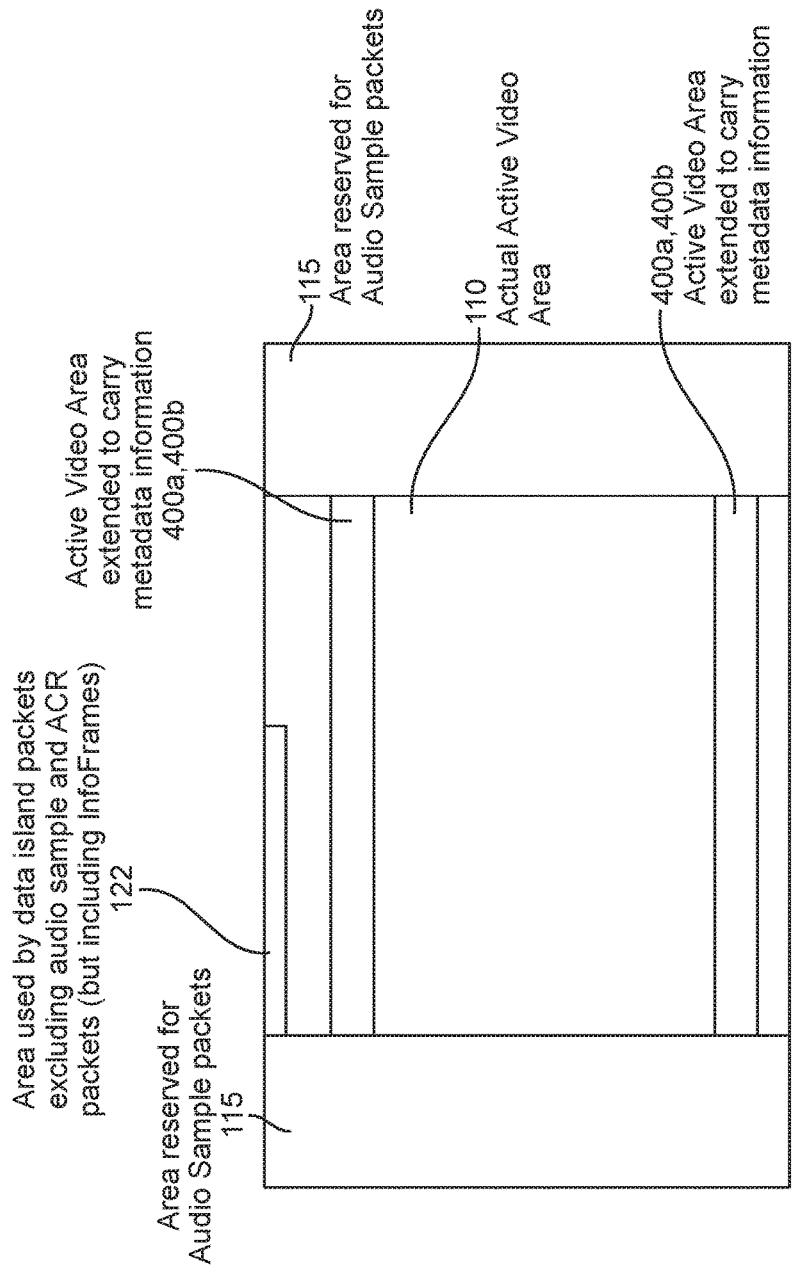
FIG. 4 depicts an example implementation of extending an active video area in order to encode metadata as video data in the extended active video area(s)

FIG. 4 depicts an example of how video fields can be encoded in order to make use implementations according to FIG. 3. FIG. 4 depicts that rather than including metadata in data islands, metadata is encoded into an extended portion 400a, 400b of the active video area (two extensions are depicted here, but implementations may include only 400a or 400b). In other words, one or more blanking intervals are shortened, and the active video area is increased. Metadata is encoded as though it represents video data for display. The active video area can be extended in HDMI by manipulating a timing of when character sequences indicative of the Video Data Period are provided.

Within a receiver, a Data Enable (DE) signal can be generated in response to detection of the character sequences indicative of the Video Data Period. A level of the DE signal can indicate whether data being transmitted is or is not video data. Thus, in one approach, the Video Data Period begins earlier and/or continues longer (and consequently, a DE signal would be brought high earlier and/or maintained high later while preserving other video timing) in order to extend what HDMI receiver 152 would identify as video data. This approach to metadata transmission does not need to take the place of data islands. Metadata could be transferred in data islands also, or data islands could be used for encoding or transmitting other data.

Particulars of how metadata can be encoded into the extended active video area can vary among implementations, although a standardized approach would allow increased inter-operability. In one approach, metadata can be encoded directly into the extended (also can be called "overscan" area in that the extended "video" area is not intended for actual display) or into Least Significant Bits, or at fixed locations, such as particular lines, or fixed positions within lines in the extended area. An implementation can use a similar structure to data islands. A generic packet structure can be defined to carry various metadata payloads. To be clear, the approach to encoding metadata into the extended active video area in an implementation decision, in that transmitters and receivers will treat the physical transmission and reception of such metadata simply as video data.

In one implementation, one HDMI/MHL field in a sequence will be encoded with metadata for a subsequent-in-display-order (e.g., a next) field. Extracted metadata is kept in a buffer until a VSYNC pulse. On the pulse, the stored metadata is applied to configure processing for the next field or frame to be displayed (e.g., to determine resolution, color encoding, and so on).

Some existing repeaters may need a SW or firmware update to allow the capabilities propagate from sink to source and be ready to tolerate the additional "video" lines.

In one approach, a standard Video Identification Code (VIC), provided in an AVI InfoFrame (for HDMI) or in a Device Connection Database (DCDB) for MHL indicates video resolution (i.e., the active video area), which indicates the number of video data lines being transmitted for each field. A Vendor Specific InfoFrame (VSIF) (for HDMI) or a DCDB for MHL is used to indicate modified video timing due to encoding of metadata as active video data.

A sink can indicate capability to support metadata encoding according to the disclosure to a source by transmitting a capability indication through a control channel. For example, using a display data channel via SCDC for HDMI or control bus via DCDB for MHL. In one approach, the sink's support for receiving metadata as active video and also support for each separate capability, such as Dynamic HDR, is also separately indicated.

Examples of an encoding format for metadata is a structure that allows embedding different sub-structures that communicate different kinds of metadata. Examples of metadata that can be provided from a source include metadata about High Dynamic Resolution (HDR), Display Stream Compression (DSC) PPS. HDMI includes a capability indication SCDC (for HDMI) and DCDB (for MHL) need to have a flag indicating sink ability to receive the metadata in video lines. Each sub-structure, within the general structure, can have a separate capability indication flag, for example, a sub-structure for Dynamic HDR can have a separate flag to indicate support for that capability.

An example data line structure can support that all pixels in a line are used for metadata encoding. So, a number of bits of metadata that can be stored per pixel and per line would vary based on resolution and color depth. In each video field, information in each next metadata line can be a continuation of the information of the previous metadata line. In one approach, metadata encoding is not continued across boundaries of fields, but in another implementation, metadata can be continued from one field to another.

Forward Error Correction (FEC) can be used to provide error detection and/or error correction capability for the metadata. FEC could be implemented in software on a CPU for only the metadata. If FEC were used for the entire active video area (including metadata), then hardware support would be desirable.

Figure 5:
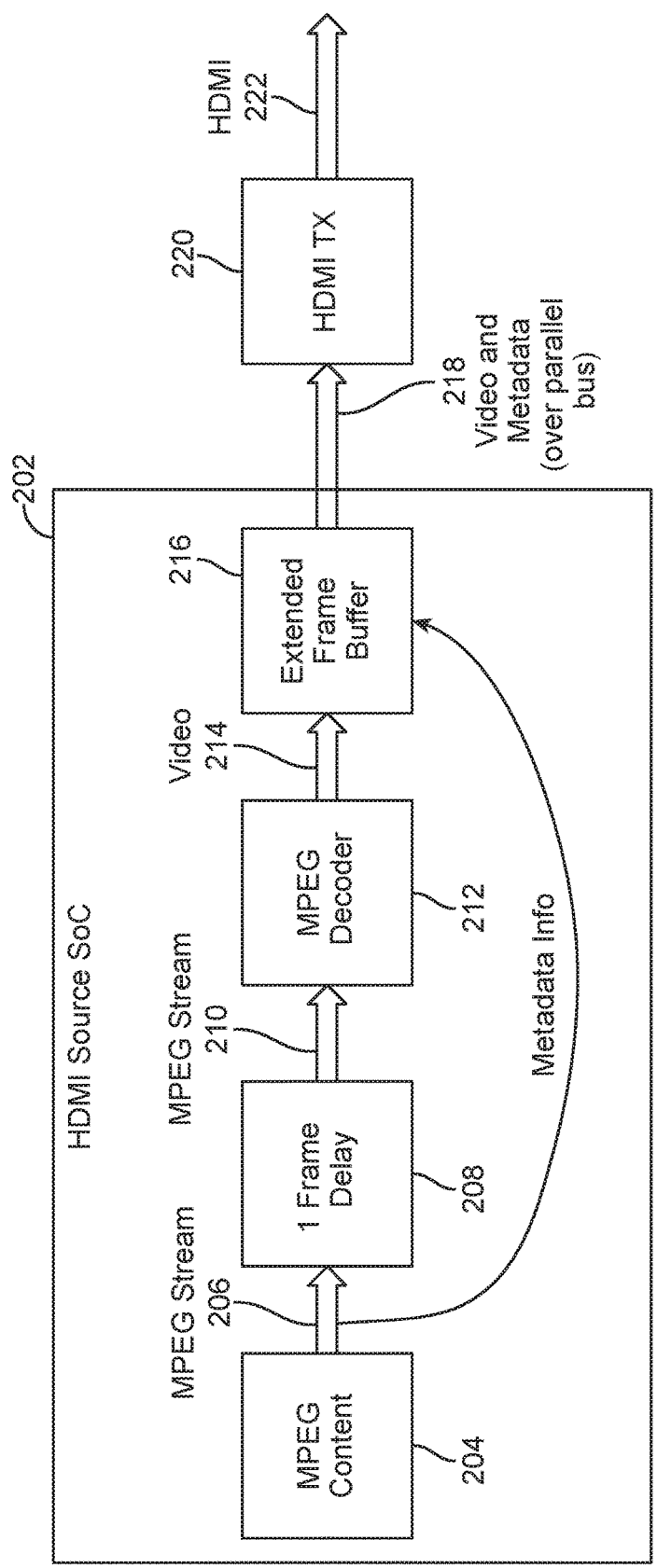
FIG. 5 depicts an example implementation of a source that encodes metadata according to the disclosure.

The following figures present various examples of how embodiments according to the disclosure can be implemented. FIG. 5 depicts an example HDMI source System on Chip (SOC) 202. A source of MPEG content 204 (MPEG content source 204) outputs an MPEG stream 206 to a one frame delay 208, while metadata from the MPEG content is loaded by a metadata encoder 205 into an extended frame buffer 216. MPEG stream 210 is output from one frame delay 208, and provided to MPEG decoder 212. Uncompressed video 214 is then loaded into extended frame buffer 216 in appropriate locations, and data from the frame buffer is transferred, such as over a parallel system bus) to an HDMI transmitter 220, which outputs an HDMI signal, including a DE signal with timing modified to reflect the extension of the active video area in which metadata is encoded. While this example is of a one-frame delay of video to metadata (i.e., metadata leads video data by one frame), other implementations can be provided. For example, a zero frame delay can be implemented, such that metadata transmitted can be applied directly to video data in that same frame. A multiple frame delay (n frames) can be implemented. An amount of delay can be specified by the metadata as a field. A sequence or selection of frames to which particular metadata is to be applied can be specified; different metadata for different frames in a sequence can be specified.

Figure 6:
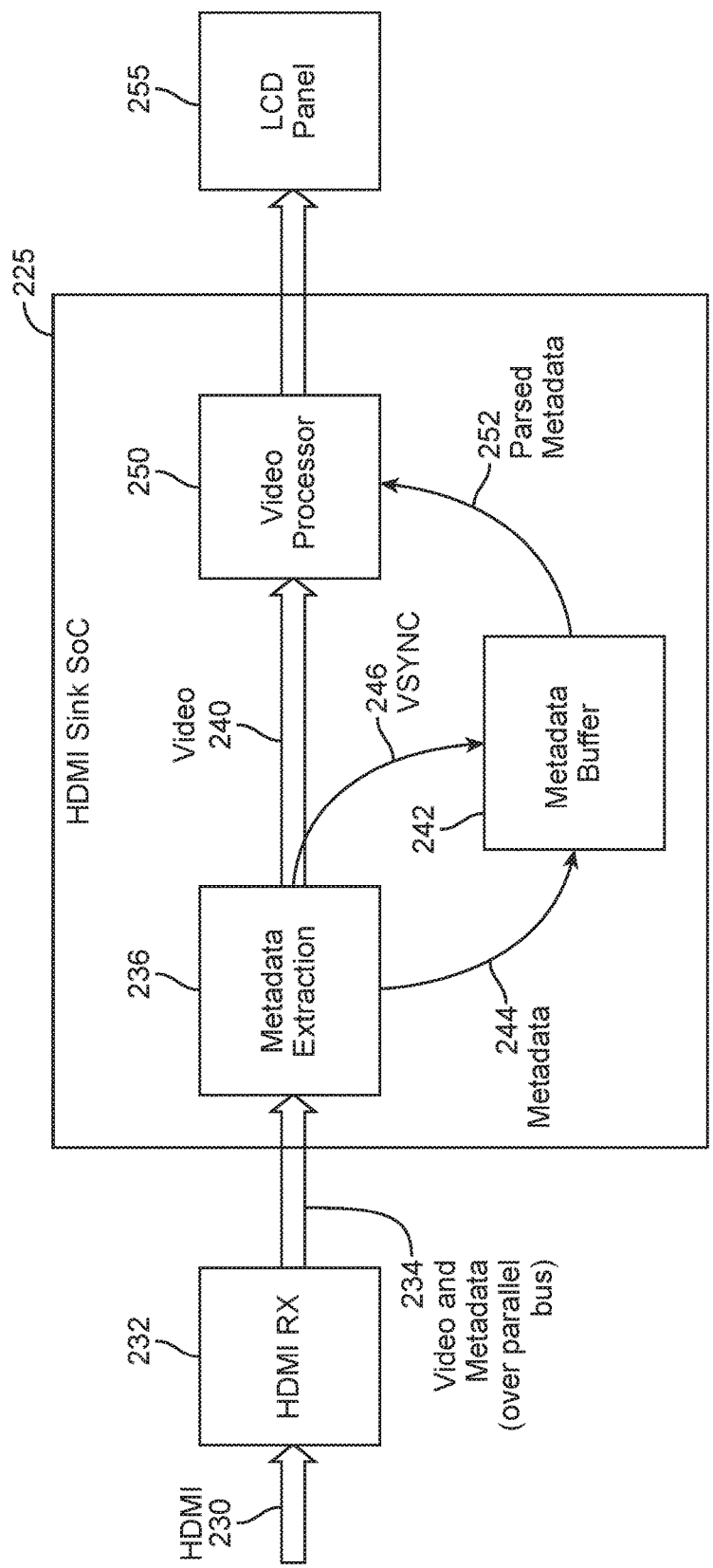
FIG. 6 depicts an example implementation of a sink that extracts metadata according to the disclosure.

FIG. 6 depicts an HDMI receiver 232 receiving an HDMI signal 230 and providing active video data (which includes encoded metadata in an extended active video region) over a bus 234 to an HDMI sink SOC 225. Sink 225 includes metadata extraction circuitry 236, which extracts metadata 244 from extended active regions and causes metadata 244 to be stored in a metadata buffer 242, and also transmits video 240 to a video processor 250. Metadata 244 is outputted from metadata buffer 242 in response to a VSYNC 246 received through HDMI receiver 232. Metadata 244 is parsed through a metadata processing circuitry to extract relevant features (such as dynamic HDR data) and then provides that parsed metadata (extracted features) for configuring a video processor 250 to process a subsequent field of video data that will be received by HDMI receiver 232. An LCD panel 255 receives output video data from video processor 250.

Figure 7:
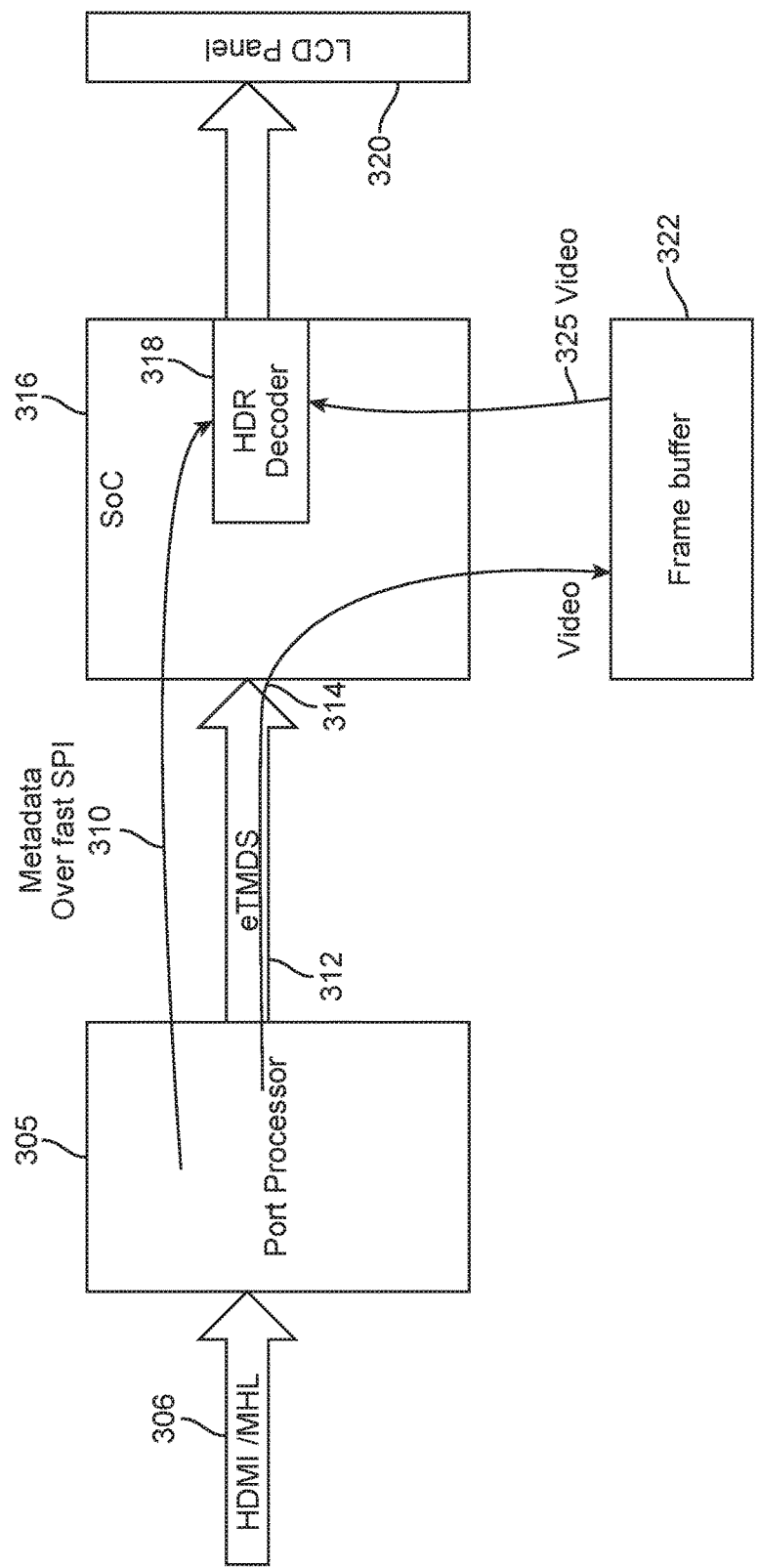
FIG. 7 depicts an example implementation of a sink that supports High Dynamic Range (HDR) processing with an HDR decoder in a system on chip (SOC) that receives HDR metadata over an SPI interface from a port processor that separates metadata within an active video area from actual video data.
Figure 8:
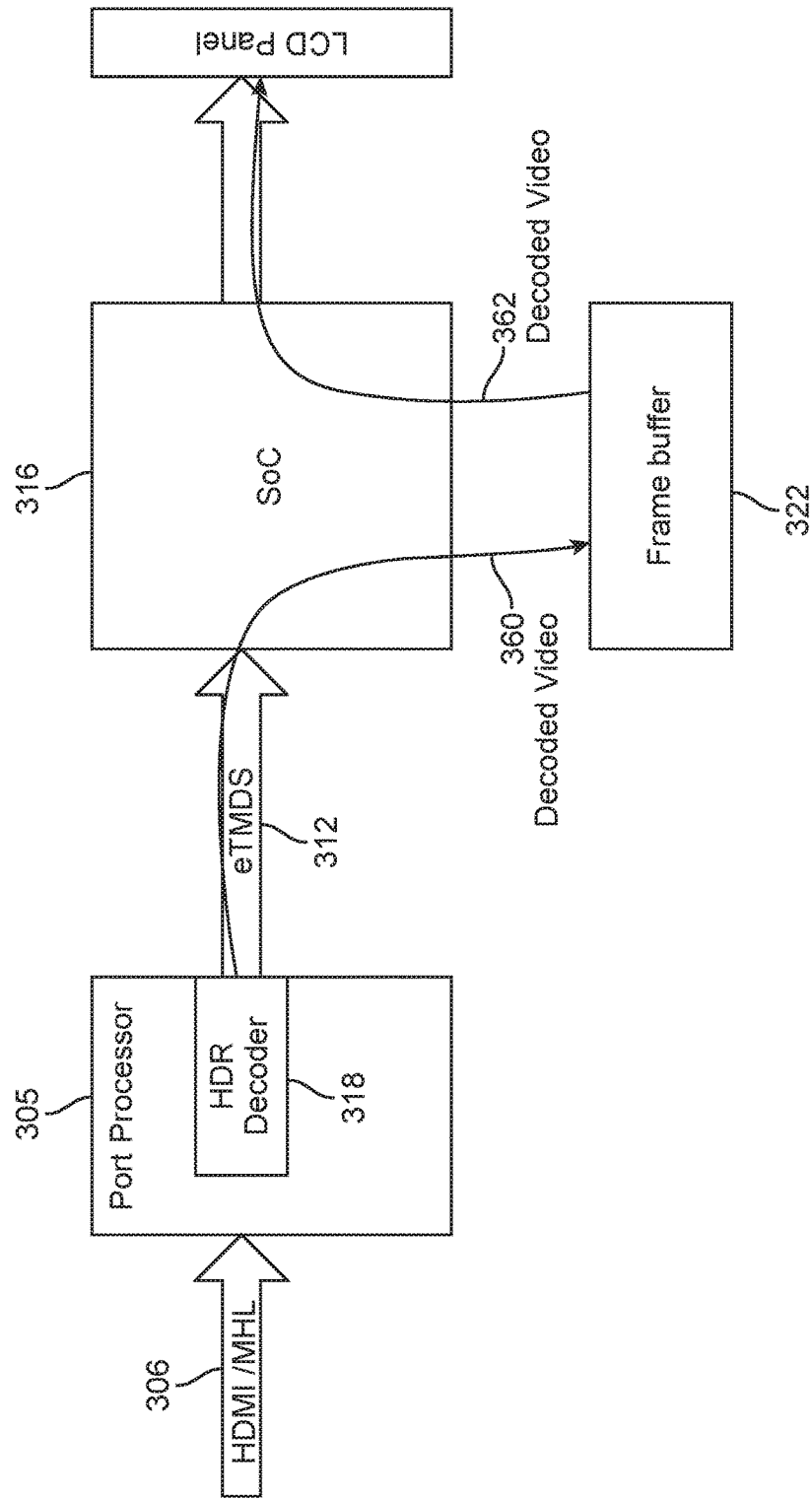
FIG. 8 depicts an example implementation of a sink that supports HDR processing with an HDR decoder in a port processor, where the HDR decoder uses metadata from an active video data area.
Figure 9:
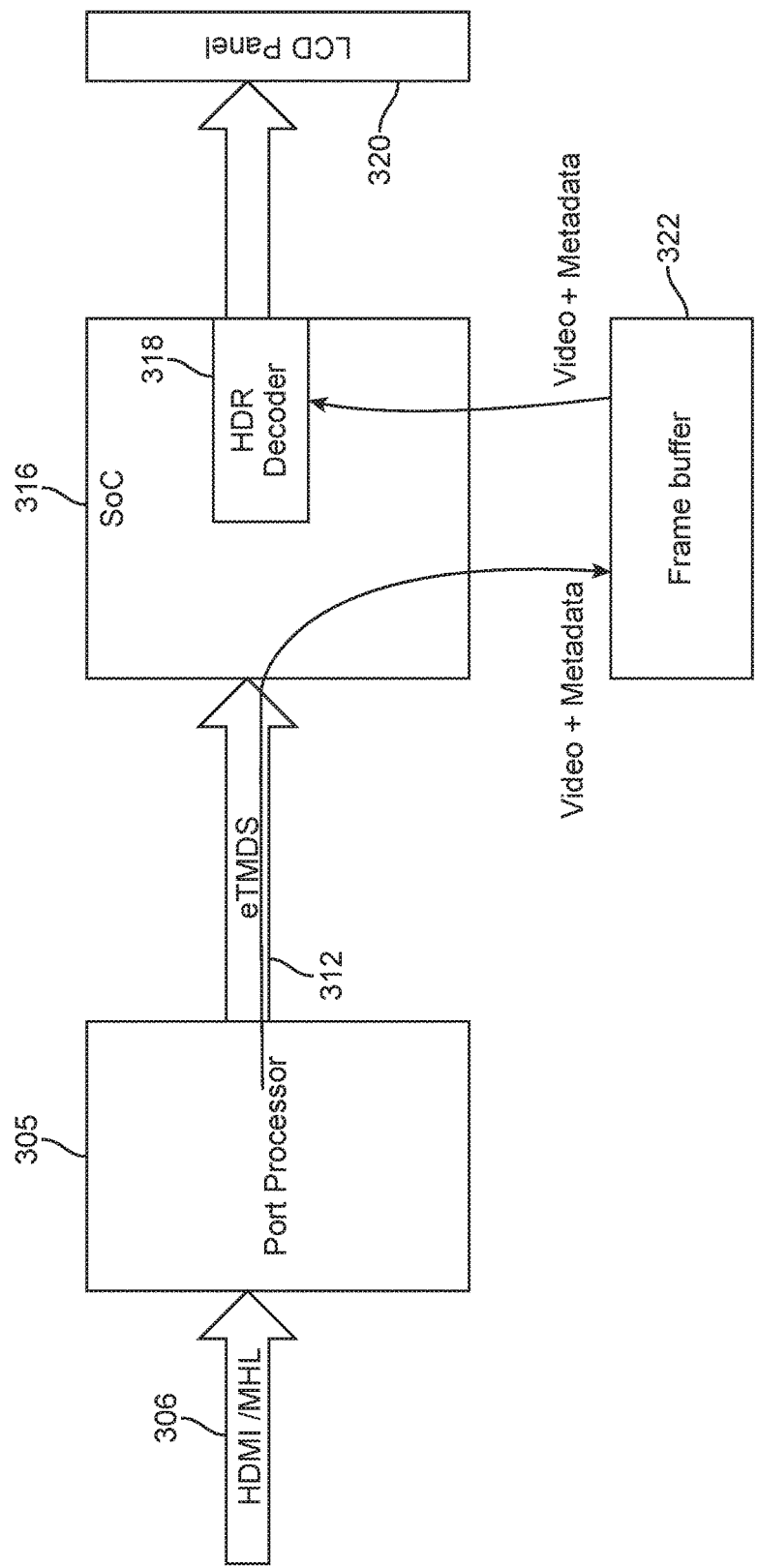
FIG. 9 depicts an example implementation of a sink that supports High Dynamic Range (HDR) processing with an HDR decoder in a system on chip (SOC) that receives video and metadata from a framebuffer, such that video and metadata transmitted as video data can be handled together.

FIGS. 7-9 depict example implementations of sinks that can receive and use metadata according to the disclosure. In particular, these figures depict different locations at which metadata extraction and application of metadata to video data can be performed. FIG. 7 depicts an HDMI or MHL signal 306 being received at a port processor 305. Port processor 305 separates metadata from extended active video regions over a fast System Peripheral Interface (SPI) bus to a System on Chip (316) that includes an HDR decoder 318 that consumes the metadata for its configuration. Using SPI is an example. Video data 314 extracted by port processor 305 is transmitted by an embedded Transition Minimized Differential Signal (eTMDS) channel 312 to SOC 316, which stores video data 314 in frame buffer 322. Video 325 is output from frame buffer 322 to HDR decoder 318 for processing and then output to LCD panel 320. Transfer of video data 314 to and from frame buffer 322 can be accomplished by a variety of approaches, including Direct Memory Access (DMA) circuitry that can be located in SOC 316.

FIG. 8 depicts an alternate approach in which like circuitry or features are given like numbers. FIG. 8 depicts that HDR decoder 318 can be located in port processor 305. In such case, metadata extracted by port processor can be provided to HDR decoder 318 within port processor, and does not need to transit eTMDS 312. HDR decoder 318 applies the metadata for video processing and outputs decoded and processed video data 360 over eTMDS 312 to frame buffer 322, which then supplies decoded video 362 for display on LCD panel 320. Decoded video data 360 and 362 are given different numbers to indicate that certain video data may be retrieved (e.g. for one frame in a sequence) while other video data is being stored for a subsequent frame). In the example of FIG. 8, separate transfer of metadata is not required to SoC 316.

FIG. 9 presents a third example implementation where like circuitry is given like numbers. FIG. 7 depicted that port processor 305 extracted metadata from the extended active video region and transmitted metadata separately to SOC 316. FIG. 8 depicted that HDR decoder 318 could be located in port processor 305. FIG. 9 presents an example where port processor 305 performs receiver functions, but transmits all data identified as active video data (both actual video data and metadata encoded in an extended active video region) over eTMDS 312 to SOC 316, for storage in frame buffer 322 and subsequent retrieval. HDR decoder 318 then extracts and processes that metadata from the extended active video region. In the example where metadata encoded in one field is applied in to a subsequent field, HDR decoder 318 buffers the metadata and then effects changes indicated by the metadata in order to decode the subsequent field.

The invention claimed is:

1. A method of communicating a sequence of video fields and metadata between a transmitter device and a receiver device coupled by a communications link complying with a video communication standard that specifies a blanking interval and an active video area, comprising:
obtaining metadata to be transmitted;
determining a modification to a standard video timing, according to a video format used for video transmission;
signaling a modification to the standard video timing, the modification comprising extending an active video area into a blanking interval defined by the standard video timing to define a modified active video area;
encoding the metadata into a data structure; and
signaling, at a physical layer of the communications link, data separating the blanking interval from the modified active video area, signaling the data structure within the extended active video area, which is within the modified active video area but which would have been in the blanking interval according to the standard video timing and signaling, in the active video area, video data for a current video field in the sequence of video fields.

2. The method of claim 1, further comprising, at the receiver device, receiving the extended active video area, extracting the metadata and applying the metadata to control display of a subsequent video field in the sequence of video fields.

3. The method of claim 1, wherein the video format comprises a resolution of the video field and a color depth for pixels in the video field.

4. The method of claim 1, further comprising encoding the data structure for the metadata according to the video format, using as many lines of pixels as required to fully encode the data structure.

5. The method of claim 1, wherein the video communication standard is HDMI, or MHL and the signaling of the modification to the standard video timing comprises extending a time in which a Data Enable (DE) signal is active.

6. The method of claim 1, further comprising sending a Vendor Specific InfoFrame (VSIF) indicating support for decoding metadata as active video data.

7. A method of displaying video data, comprising:
indicating, to a transmitter device, from a receiver device, which are coupled by data channel complying with a video communication standard that specifies a blanking interval and an active video area, support for decoding metadata within an active video area;
receiving a signal that indicates when active video data for a video field in a sequence of video fields is present on the data channel;
receiving data from the data channel during a time when the signal indicates active video data is present;
using a first portion of the received data as active video data, that specifies at least pixel color data, for the video field in order to drive a display; and
using a second portion of the received data to adjust one or more settings that controls how the receiver device interprets and organizes the active video data according to resolution and color depth information sent in the metadata for display as a field in the sequence of video fields.

8. The method of claim 7, further comprising receiving an indication of a modified video timing and using the indication to separate the first portion of received data from the second portion.

9. The method of claim 7, wherein the indication is a vendor specific identifier message that communicates a modification to a standard video timing as determined according to an actual resolution of the video data in the field.

10. The method of claim 7, further comprising reversing a forward error correction encoding applied to the second portion of received data.

11. The method of claim 7, wherein the indication is a vendor specific identifier message that communicates a modification to a standard video timing as determined according to an actual resolution of the video data in the field.

* * * * *